(12) United States Patent
Guitas

(10) Patent No.: US 7,257,889 B1
(45) Date of Patent: Aug. 21, 2007

(54) METHOD FOR INSERTING WIRES THROUGH BRAIDED SHIELDING

(75) Inventor: David R. Guitas, Alpine, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 113 days.

(21) Appl. No.: 11/181,478

(22) Filed: Jul. 14, 2005

(51) Int. Cl.
*H01R 43/00* (2006.01)

(52) U.S. Cl. .......................... 29/825; 156/47; 156/48; 156/55

(58) Field of Classification Search ................. 29/825; 156/47, 48, 55
See application file for complete search history.

(56) References Cited

U.S. PATENT DOCUMENTS

| 4,174,563 | A | * | 11/1979 | Simpson | 29/843 |
| 4,568,401 | A | * | 2/1986 | Davis | 156/55 |
| 2002/0182940 | A1 | * | 12/2002 | Haas et al. | 439/669 |
| 2003/0207620 | A1 | * | 11/2003 | Haas et al. | 439/669 |

* cited by examiner

*Primary Examiner*—Carl J. Arbes
(74) *Attorney, Agent, or Firm*—Michael A. Kagan; Peter A. Lipovsky; Allan Y. Lee

(57) ABSTRACT

A method for feeding wires through a braided shield, comprises steps of wrapping the ends of the wires with tape to create a plug end; inserting the plug end into a flexible tube that is mounted to an insert tool having a tapered end; feeding the insert tool through the braided shield to pull the wires through the braided shield; removing the plug end from the flexible tube; and unwrapping the tape from around the wires.

8 Claims, 2 Drawing Sheets

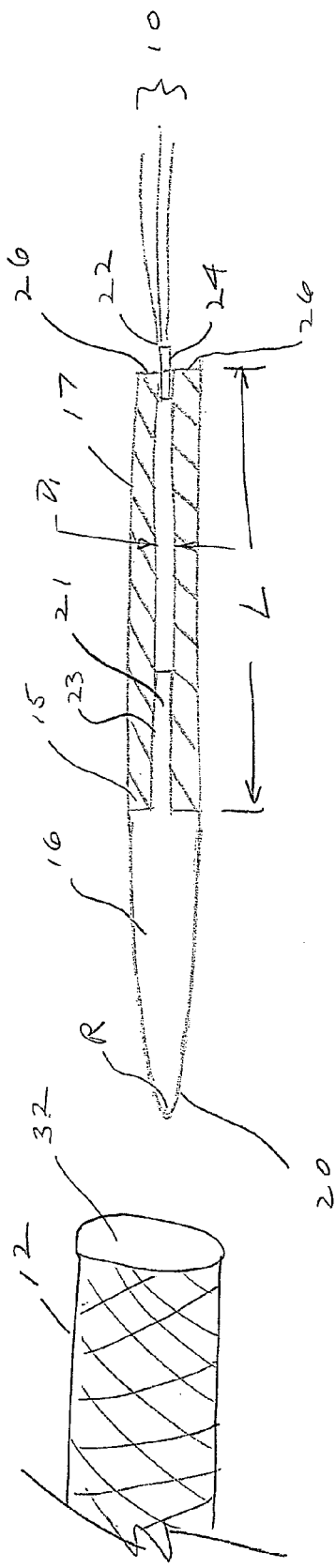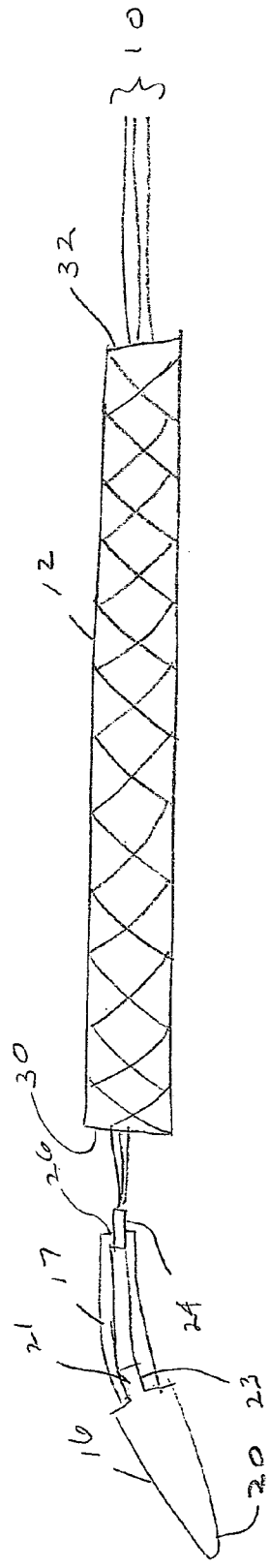

METHOD FOR INSERTING WIRES THROUGH BRAIDED SHIELDING

SUMMARY OF THE INVENTION

A method for feeding wires through a braided shield, comprises the steps of wrapping the ends of wires with tape to create a plug end; inserting the plug end into a flexible tube that is mounted to an insert tool having a tapered end; feeding the insert tool through the braided shield to pull the wires through the braided shield; removing the plug end from the flexible tube; and unwrapping the tape from around the wires.

BRIEF DESCRIPTION OF THE DRAWINGS

FIG. 1 illustrates a method for inserting wires through braided shielding.

FIG. 3 shows wires inserted through braided shielding.

Throughout the several views, like elements are referenced using like references.

DESCRIPTION OF THE PREFERRED EMBODIMENT

Figure 2:
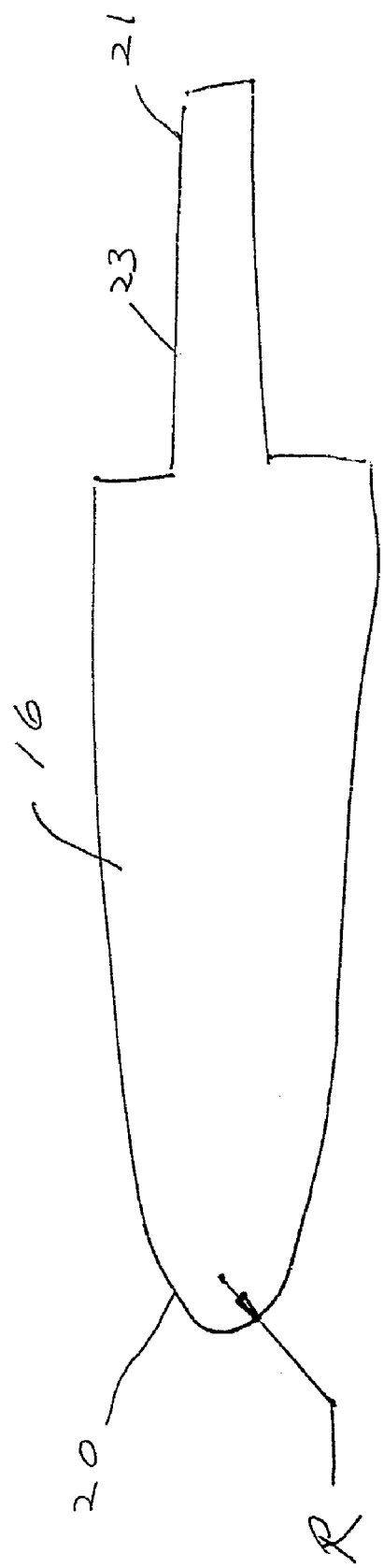
FIG. 2 shows an example of the curved radius of an insert tool that may be used to implement the method illustrated in FIG. 1.

Referring to FIG. 1, there is illustrated a method for feeding one or more wires, collectively referenced as "wires" 10, through a braided shield 12. Although three wires 10 are shown by way of example in FIG. 1, it is to be understood that any number of wires may be used in accordance with the teachings herein. An insert tool 16 has a tapered leading end 20 and an opposite end 21 which is shaped as a cylindrical shaft 23 for frictionally engaging a first end 15 of a length L of flexible tube 17 with an interference fit. The tube 17 may have a suitable inside diameter D, and be made, by way of example, of a resilient and flexible material that the tube 17 may be bent to easily feed through braided shielding 22, and expanded to frictionally engage the shaft 21 with an interference fit. Tube 17 may be made of material such as plastic, polyvinyl chloride, neoprene, polyethylene, polyurethane, rubber, or other soft material. In one embodiment, flexible tube 17 may be made of Tygon® tubing. The length L may be in the range of about three to 18 inches, but may also be configured in other lengths required to suit the requirements of a particular application. One end 22 of the wires 10 may be wrapped within an adhesive tape, such as masking or electrical tape, to create a plug end 24 that is inserted into a second end 26 of the flexible tube 17 and held therein with an interference fit. The insert tool 16 may be made of a rigid or semi-rigid material, such as metal, plastic, hardened rubber, and have a blunted tip, having a radius R, of at least 0.50 inch or more, as shown in FIG. 2, and have a tapered cross-sectional area. By way of example, insert tool 16 may have an ogive, triangular prismatic, or any other smoothly tapered shape for facilitating smooth feeding of the insert tool 16 through braided shielding 12 without catching. An ogive shape is defined as one in which in any side view, it appears as a pointed arc, while any cross section perpendicular to its long axis appears as a circle.

Referring to FIG. 2, the tapered end 20 of insert tool 16 is inserted into a first end 32 of the braided shield 12, which then may be bunched up and pulled towards first end 32, so that the insert tool 16 and attached wire harness 10 may be pulled through the braided shield 16. This process may be repeated until the wire harness 10 extends through both ends 30 and 32 of the braided shield 12. Then, the plug end 24 is withdrawn from the end 26 of flexible tube 17, whereupon the tape may be unwrapped from around wires 10.

The method for feeding wires 10 through the braided shield, 12 comprises the steps of wrapping the ends of the wires 10 with tape to create a plug end 24; inserting the plug end 24 into a flexible tube 17 that is mounted to an insert tool 16 having a tapered end 20; feeding the insert tool 20 through the braided shield 12 to pull the wires 10 through the braided shield 12; removing the plug end 24 from the flexible tube; and unwrapping the tape from around the wires 10.

Obviously, many modifications and variations of the invention are possible in light of the above teachings. It is therefore to be understood that within the scope of the appended claims, the invention may be practiced otherwise than as specifically described.

I claim:

1. A method for feeding wires through a braided shield, comprising the steps of:
   wrapping the ends of said wires with tape to create a plug end;
   inserting said plug end into a flexible tube that is mounted to an insert tool having a tapered end;
   feeding said insert tool through said braided shield to pull said wires through said braided shield removing the plug end from said flexible tube; and
   unwrapping said tape from around said wires.

2. The method of claim 1 wherein said insert tool has an ogive-shaped cross-section.

3. The method of claim 1 wherein said insert tool is made of a rigid material.

4. The method of claim 3 wherein said insert tool is made of a material that consists essentially of a metal.

5. The method of claim 3 wherein said insert tool is made of a material that consists essentially of plastic.

6. The method of claim 3 wherein said insert tool is made of a material that consists essentially of a semi-rigid material.

7. The method of claim 6 wherein said insert tool is made of a material that consists essentially of rubber.

8. The method of claim 1 wherein said flexible tube is mounted to a cylindrical shaft end of said insert tool by an interference fit.

* * * * *